US 11,512,445 B2

(12) United States Patent
Kovalick (10) Patent No.: US 11,512,445 B2
(45) Date of Patent: Nov. 29, 2022

(54) DRAWBAR-CIRCLE-MOLDBOARD ASSEMBLY FOR A WORK MACHINE

(71) Applicant: Caterpillar Inc., Deerfield, IL (US)

(72) Inventor: Benjamin J. Kovalick, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 782 days.

(21) Appl. No.: 16/431,112

(22) Filed: Jun. 4, 2019

(65) Prior Publication Data

US 2020/0385954 A1   Dec. 10, 2020

(51) Int. Cl.
    *E02F 3/76*     (2006.01)
    *F16C 33/58*   (2006.01)
    *E02F 3/84*     (2006.01)

(52) U.S. Cl.
    CPC ............. *E02F 3/764* (2013.01); *E02F 3/844* (2013.01); *F16C 33/58* (2013.01); *E02F 3/7645* (2013.01); *F16C 2350/26* (2013.01)

(58) Field of Classification Search
    CPC ......... E02F 3/764; E02F 3/844; E02F 3/7668; F16C 33/58; F16C 2350/26
    USPC .................................................. 172/796, 792
    See application file for complete search history.

(56) References Cited

U.S. PATENT DOCUMENTS

| 3,470,967 | A |   | 10/1969 | Page et al. |
| 3,911,758 | A | * | 10/1975 | Hanser et al. .......... F16H 55/08 74/462 |
| 4,015,669 | A |   | 4/1977 | Cole |
| 4,060,136 | A | * | 11/1977 | Hendrickson et al. . E02F 3/765 172/795 |
| 4,084,644 | A | * | 4/1978 | Cole et al. .............. E02F 3/764 172/796 |
| 4,113,032 | A |   | 9/1978 | Cole |
| 4,122,903 | A | * | 10/1978 | Cole ......................... E02F 3/80 74/413 |
| 4,185,700 | A |   | 1/1980 | Atherton et al. |
| 6,851,485 | B2 | * | 2/2005 | Maeda et al. ........... E02F 3/764 172/796 |
| 7,575,068 | B2 | * | 8/2009 | Stubben ................ E02F 3/7645 172/445.2 |
| 8,464,803 | B2 | * | 6/2013 | Greuel et al. ........... E02F 3/765 172/795 |
| 2015/0135866 | A1 |   | 5/2015 | Staade et al. |

FOREIGN PATENT DOCUMENTS

CN   106351278 A   1/2017

* cited by examiner

*Primary Examiner* — Thomas B Will
*Assistant Examiner* — Joel F. Mitchell
(74) *Attorney, Agent, or Firm* — Harrity & Harrity, LLP (57) ABSTRACT

A drawbar-circle-moldboard assembly for a work machine includes a drawbar, a circle assembly, and a moldboard. The drawbar is configured to be pivotably connected to a frame of the work machine. The circle assembly is rotatably connected to the drawbar and includes a circle member formed from a hollow box section. The moldboard is connected to the circle assembly.

20 Claims, 8 Drawing Sheets

DRAWBAR-CIRCLE-MOLDBOARD ASSEMBLY FOR A WORK MACHINE

TECHNICAL FIELD

The present disclosure relates generally to a work machine, and, more particularly, to a drawbar-circle-moldboard assembly for controlling a work implement of work machine.

BACKGROUND

Motor graders are primarily used as finishing tools to sculpt a surface of a construction site to a final shape and contour using blade. The blade is suspended from the frame of the motor grader by a drawbar-circle-moldboard assembly that is configured to be moved in various directions relative to the frame such that the blade can be moved to sculpt the final shape and contour of the surface. The drawbar-circle-moldboard assembly includes a drawbar, a circle assembly, and a moldboard. A frontward portion of the drawbar is connected to the frame by a ball and socket connection, and a rearward portion of the drawbar is suspended from the frame by hydraulic cylinder and piston means such that the drawbar can swing in a vertical plane about the front end of the drawbar. The circle assembly is rotatably connected to the drawbar, and the moldboard and, consequently, the blade are fixed to the circle assembly, such that the blade can rotate relative to the drawbar as the circle assembly rotates relative to the drawbar.

Circle assemblies are typically made from a roll formed ring or a fabricated ring plate. For example, U.S. Pat. No. 3,470,967 ("the '967 patent"), issued to Page et al. on Oct. 7, 1969, describes a circle that is roll formed and provided with a continuous bearing groove around an outer surface for receiving bearing balls.

SUMMARY

An exemplary embodiment of a work machine includes a frame, at least one steerable traction device connected to the frame, at least one driven traction device connected to the frame, and a drawbar-circle-moldboard assembly connected to the frame. The drawbar-circle-moldboard assembly includes a drawbar, a circle assembly, a moldboard, and at least one drive member. The drawbar is pivotably connected to the frame. The circle assembly is rotatably connected to the drawbar and includes a circle member formed from a hollow box section. The mold board is connected to the circle assembly, and the at least one drive member is configured to rotate the circle assembly relative to the drawbar.

An exemplary embodiment of a drawbar-circle-moldboard assembly for a work machine includes a drawbar, a circle assembly, and a moldboard. The drawbar is configured to be pivotably connected to a frame of the work machine. The circle assembly is rotatably connected to the drawbar and includes a circle member formed from a hollow box section. The moldboard is connected to the circle assembly.

Another exemplary embodiment of a work machine includes a frame, at least one steerable traction device connected to the frame, at least one driven traction device connected to the frame, and a drawbar-circle-moldboard assembly connected to the frame. The drawbar-circle-moldboard assembly includes a drawbar, a circle assembly, a moldboard, and at least one drive member. The drawbar is pivotably connected to the frame, and the circle assembly is rotatably connected to the drawbar. The circle assembly includes a circle member and a ring bearing. The circle member is formed from a hollow box section. The ring bearing has an inner ring and an outer ring, in which the inner ring is connected to the circle member and the outer ring is connected to the drawbar. The outer diameter of the ring bearing is less than or equal to 2,000 mm. The moldboard is connected to the circle assembly. The at least one drive member is operatively connected to the ring bearing such that the at least one driving member is configured to engage the ring bearing to rotate the circle member relative to the drawbar.

DETAILED DESCRIPTION

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in the exemplary embodiments.

The present application discloses work machines that include a drawbar-circle-moldboard assembly. The drawbar-circle-moldboard assembly includes a circle member that is formed by a hollow box section. In certain embodiments, the circle member is attached to a ring bearing, and the ring bearing is engaged by one or more drive members to cause the circle member to rotate relative to a drawbar of the assembly. In these embodiments, the inner diameter of the circle member is sized and configured to receive the ring bearing such that the circle member provides a structural support to the ring bearing. In other embodiments, the circle member is directly engaged by one or more drive members to cause rotation of the circle member relative to the drawbar. In these embodiments, wear strip mounts and wear strips are positioned such that wear between the circle member and the drive members is prevented, and the circle member is sized and configured to minimize the engagement area between the various components of the circle member and the drive member.

Figure 1:
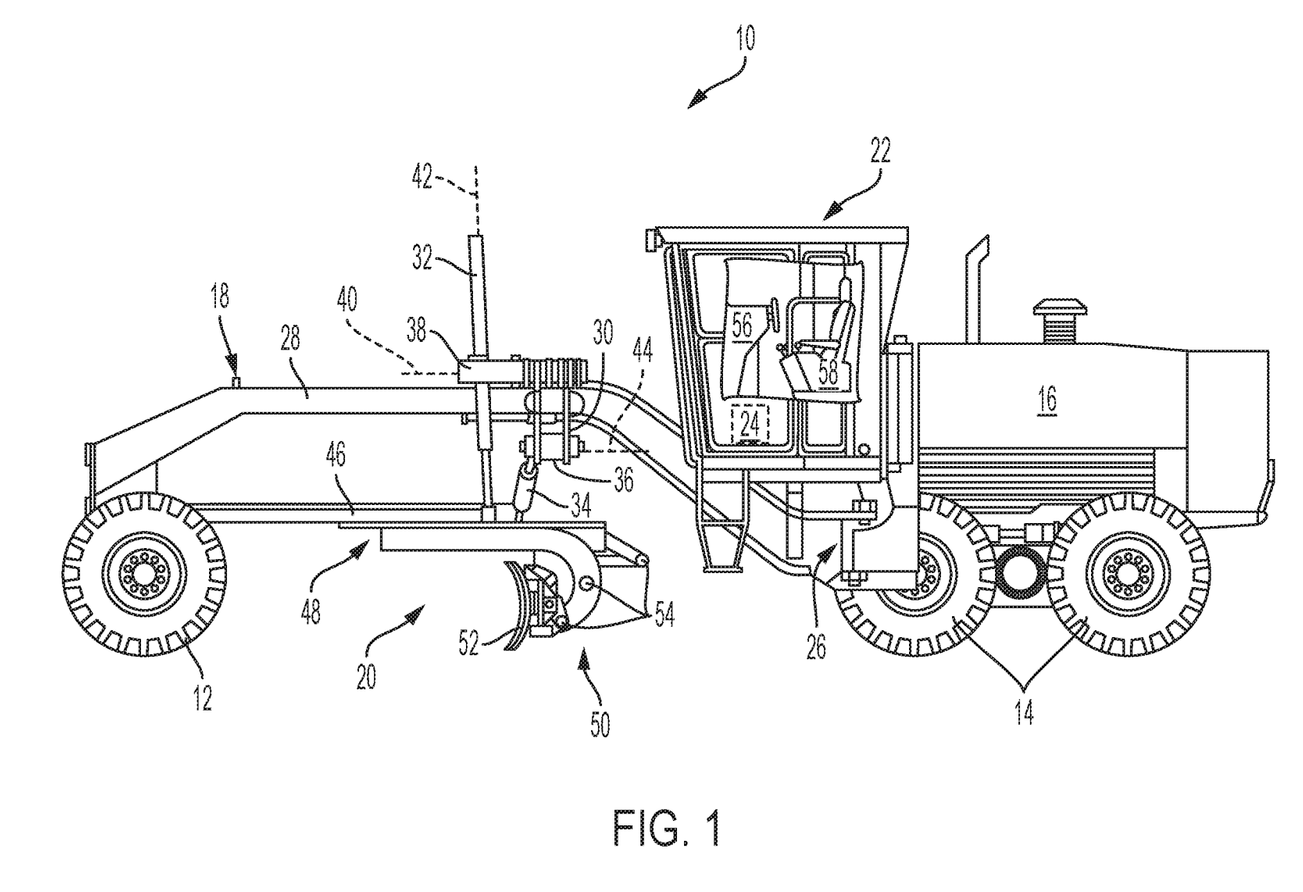
FIG. 1 is a schematic view of an exemplary embodiment of a work machine.

An exemplary embodiment of a machine 10 is illustrated in FIG. 1. Machine 10 may be a motor grader, a backhoe loader, an agricultural tractor, a wheel loader, a skid-steer loader, or any other type of machine known in the art. Machine 10 may include a steerable traction device 12, a driven traction device 14, a power source 16, supported by drive traction device 14, and a frame 18 connecting steerable traction device 12 to driven traction device 14. Machine 10 may also include a work implement such as, for example, a drawbar-circle-moldboard assembly (DCM) 20, an operator station 22, and a blade control system 24. Operator station 22 may embody an area of machine 10 configured to house an operator. Operator station 22 may include a dashboard 56 and an instrument panel 58 containing dials and/or controls for conveying information and for operating machine 10 and its various components.

Both steerable and driven traction devices 12, 14 may include one or more wheels located on each side of machine 10 (only one side shown). The wheels may be rotatable and/or tiltable for use during steering and leveling of a work surface (not shown). Alternatively, steerable and/or driven traction devices 12, 14 may include tracks, belts, or other traction devices known in the art. Steerable traction devices 12 may or may not also be driven, while driven traction device 14 may or may not also be steerable. Frame 18 may connect steerable traction device 12 to driven traction device 14 by way of, for example, an articulation joint 26. Furthermore, machine 10 may be caused to articulate steerable traction device 12 relative to driven traction device 14 via articulation joint. 26.

Power source 16 may include an engine (not shown) connected to a transmission (not shown). The engine may be, for example, a diesel engine, a gasoline engine, a natural gas engine, or any other engine known in the art. Power source 16 may also be a non-combustion source of power such as a fuel cell, a power storage device, or another source of power known in the art. The transmission may be an electric transmission, a hydraulic transmission, a mechanical transmission, or any other transmission known in the art. The transmission may be operable to produce multiple output speed ratios and may be configured to transfer power from power source 16 to driven traction device 14 at a range of output speeds.

Frame 18 may include an articulation joint 26 that connects driven traction device 14 to frame 18. Machine 10 may be caused to articulate steerable traction device 12 relative to driven traction device 14 via articulation joint 26. Machine 10 may also include a neutral articulation feature that, when activated, causes automatic realignment of steerable traction device 12 relative to driven traction device 14 to cause articulation joint 26 to return to a neutral articulation position.

Frame 18 may also include a beam member 28 that supports a fixedly connected center shift mounting member 30. Beam member 28 may be, for example, a single formed or assembled beam having a substantially hollow square cross-section. The substantially hollow square cross-section may provide frame 18 with a substantially high moment of inertia required to adequately support DCM 20 and center shift mounting member 30. In alternative embodiments, the cross-section of the beam member 28 may be rectangular, round, triangular, or any other appropriate shape.

Center shift mounting member 30 may support a pair of double acting hydraulic rams 32 (only one shown) for affecting vertical movement of the DCM 20, a center shift cylinder 34 for affecting horizontal movement of the DCM 20, and a link bar 36 adjustable between a plurality of predefined positions. Center shift mounting member 30 may be welded or otherwise fixedly connected to beam member 28 to indirectly support hydraulic rams 32 by way of a pair of bell cranks 38 (also known as lift arms). That is, bell cranks 38 may be pivotally connected to a center shift mounting member 30 along a horizontal axis 40, while hydraulic rams 32 may be pivotally connected to bell cranks 38 along a vertical axis 42. Each bell crank 38 may further be pivotally connected to a link bar 36 along a horizontal axis 44. Center shift cylinder 34 may be similarly pivotally connected to link bar 36.

DCM 20 may include a drawbar 46 supported by beam member 28 and a ball and socket joint (not shown) located proximal steerable traction device 12. As hydraulic rams 32 and/or center shift cylinder 34 are actuated, DCM 20 may pivot about the ball and socket joint. A circle assembly 48 may be connected to drawbar 46 via a motor to drivingly support a moldboard assembly 50 having a blade 52 and blade positioning cylinders 54. In addition to DCM 20 being both vertically and horizontally positioned relative to beam member 28, DCM 20 may also be controlled to rotate circle and moldboard assemblies 48, 50 relative to drawbar 46. Blade 52 may be moveable both horizontally and vertically, and oriented relative to circle assembly 48 via blade positioning cylinders 54.

Figure 2:
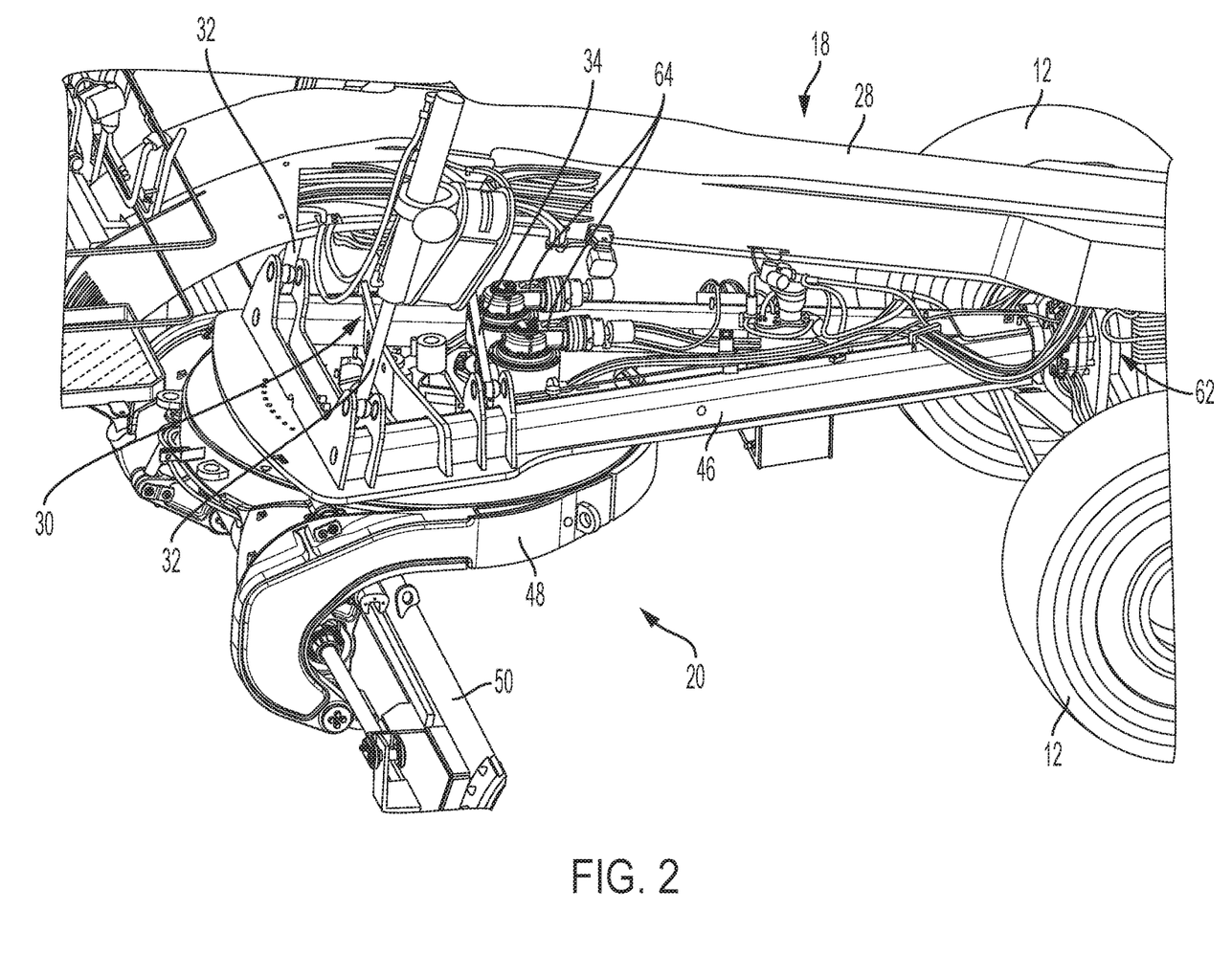
FIG. 2 is a partial perspective view of another exemplary embodiment of a work machine, showing an exemplary embodiment of a drawbar-circle-moldboard assembly.
Figure 5:
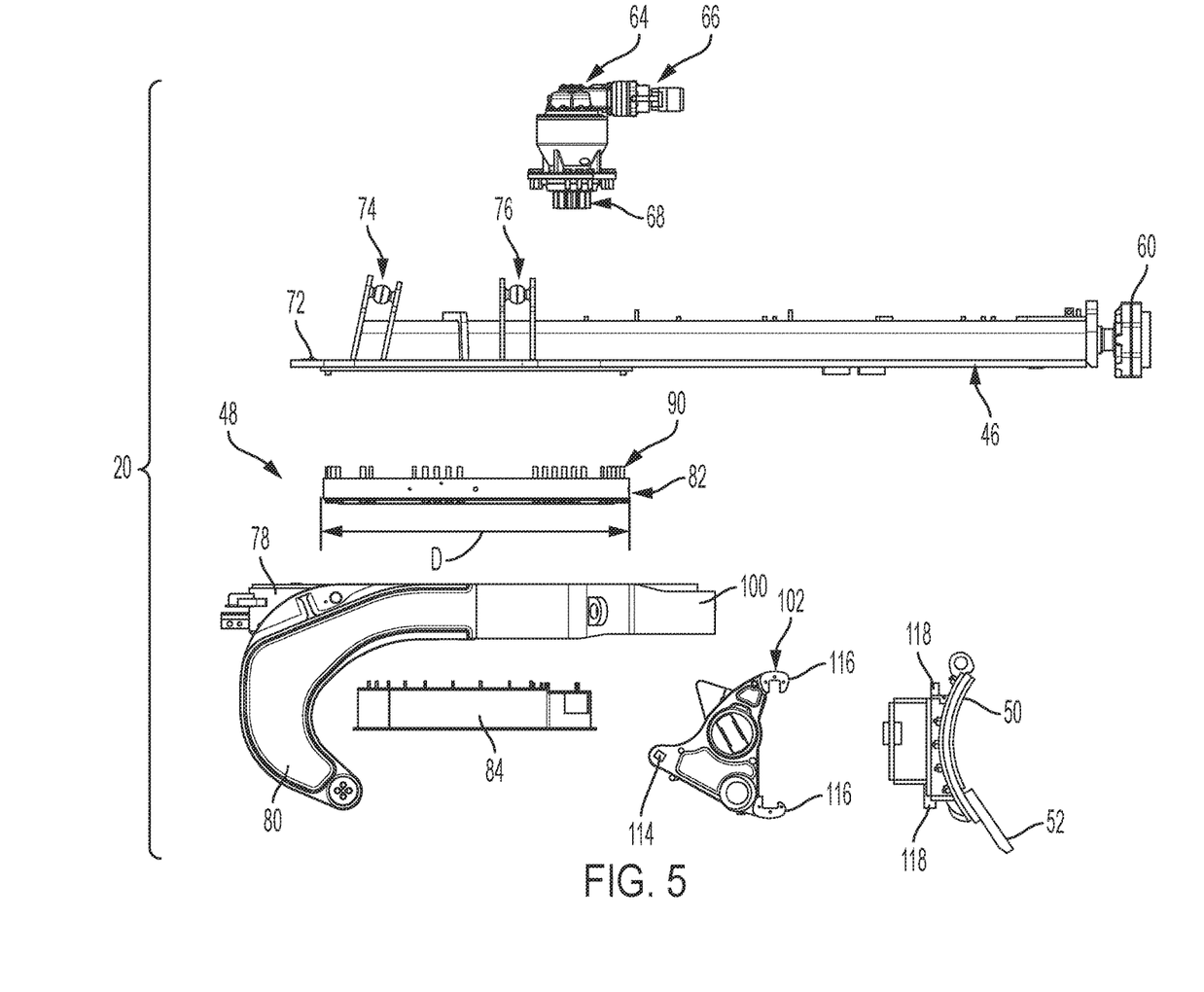
FIG. 5 is a side exploded view of the drawbar-circle-moldboard assembly of FIG. 2.
Figure 6:
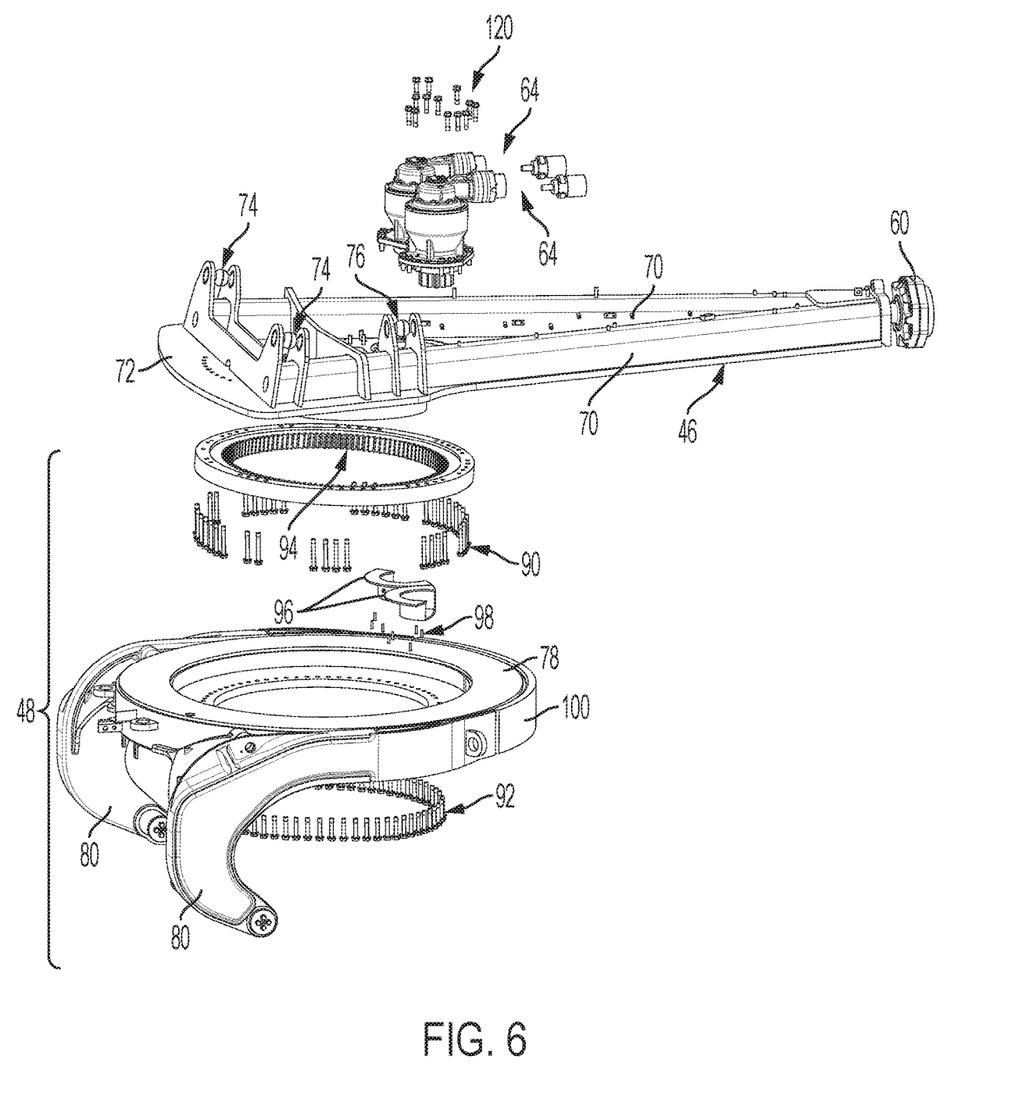
FIG. 6 is a partial exploded view of the drawbar-circle-moldboard assembly of FIG. 2, showing an exemplary connection between a drawbar and a circle assembly.

FIG. 2 illustrates a partial view of another embodiment of a work machine 10 (which is a more specific embodiment of the work machine shown in FIG. 1). The work machine includes a frame 18, steerable tracking devices 12, DCM 20, and a center shift mounting member 30. The frame 18 includes a beam member 28 that supports the center shift mounting member 30. The center shift mounting member 30 supports a pair of double acting hydraulic rams 32 for affecting vertical movement of the DCM 20 and a center shift cylinder 34 for affecting horizontal movement of the DCM 20. The frame 18 also includes a ball and socket joint 62 for receiving a ball 60 (FIG. 3) of the DCM 20. The DCM 20 includes a drawbar 46, a circle assembly 48, and a moldboard assembly 50, and a pair of drive members 64 for rotating the circle assembly 48. While the illustrated embodiment shows two drive members 64 for rotating the circle assembly 48, it should be understood that any suitable number of drives can be used to rotate the circle assembly 48. In the illustrated embodiment, the drive members 64 include a hydraulic motor 66 (FIG. 5) and gears 68 (FIG. 5). In alternative embodiments, the drive members 64 can be cylinders, cranks, gears, electric motors, fixed pin positions, or any other suitable mechanism. In certain embodiments, the drive members 64 are connected to the drawbar 46 by one or more fasteners 120 (e.g., bolts, pins, dowels, clips, or welds).

Referring to FIGS. 3-8, an exemplary embodiment of the DCM 20 includes a drawbar 46, a circle assembly 48, and a moldboard assembly 50. The drawbar 46 includes a ball 60 for connecting to a ball and socket joint 62 (FIG. 2) of the frame 18 (FIG. 2) such that the drawbar 46 can pivot relative to the frame 18. The drawbar 46 also includes one or more drawbar beams 70 and a circle mounting surface 72. In the illustrated embodiment, the drawbar 46 includes two drawbar beams 70, but it should be understood that the drawbar 46 can include any suitable number of drawbar beams 70, or any other suitable structure known to a person having ordinary skill in the art. In certain embodiments, the drawbar 46 may include connection elements 74 for connecting to the hydraulic rams 32 and a connection element 76 for connecting to the center shift cylinder 34. The connection elements 74, 76 can take any suitable form known in the art.

Referring to FIGS. 4-8, the circle assembly 48 may include a circle member 78, one or more moldboard connectors 80, and a ring bearing 82, or other suitable bearing assembly. The circle member 78 is rotatably connected to the circle mounting surface 72 of the drawbar 46 by the ring bearing 82. The ring bearing 82 is configured to allow rotation of the circle member 78 while preventing wear from the engagement between the drive members 64 and the circle assembly 48. In the illustrated embodiment, the ring bearing 82 includes an inner ring 86, an outer ring 88, and one or more rolling members 104 (FIG. 8) therebetween such that the inner ring 86 and the outer ring 88 are rotatable relative to each other. The rolling members 104 can be, ball bearings, roller bearings, magnets, any other suitable internal element for reducing friction, etc. Referring to FIG. 5, the outer diameter D of the ring bearing 82 can be, for example, between about 100 mm and about 4,000 mm, such as between 100 mm and about 3,000 mm, such as between about 100 mm and about 2,500 mm, such as between about 100 mm and about 2,000 mm, such as between about 100 mm and about 1,500 mm, such as between about 100 mm and about 1,000 mm. In some embodiments, the outer diameter D of the ring bearing 82 is less than or equal to 3,000 mm, such as less than or equal to 2,500 mm, such as less than or equal to 2,000 mm, such as less than or equal to 1,750 mm, such as less than or equal to 1,500 mm, such as less than or equal to 1,250 mm, such as less than or equal to 1,000 mm.

Referring again to FIGS. 4-8, in certain embodiments, the ring bearing 82 includes a plurality of teeth 94 (FIG. 6) that are configured to engage with the gears 68 of the drive members 64 such that the drive members 64 can be used to rotate either the inner ring 86 or the outer ring 88 relative to the drawbar 46. In the illustrated embodiment, the outer ring 88 is fixed to the circle mounting surface 72 by one or more fasteners 90 (FIGS. 5-6), the inner ring 86 is fixed to the circle member 78 by one or more fasteners 92 (FIG. 6), and the inner ring 86 includes the teeth 94 that are engaged by the drive members 64. The fasteners 90, 92 can be, for example, bolts, pins, clips, welds, etc. In alternative embodiments, the inner ring 86 can be fixed to the circle mounting surface 72 of the drawbar 46, the outer ring 88 can be fixed to the circle member 78 of the circle assembly 48, and the outer ring 88 includes the teeth 94 that are engaged by the drive members 64.

The moldboard connectors 80 are fixed to the circle member 78 such that rotation of the circle member 78 causes the moldboard connectors 80 and, consequently, the moldboard 50 to rotate. In the illustrated embodiment, the circle assembly 48 includes two moldboard connectors 80 having a fish-hook shape and a curved member 100 that connects the two moldboard connectors 80. The curved member 100 is sized to receive the circle member 78 such that the circle member and curved member can be fixedly connected during the manufacturing of the DCM 20. That is, the circle member 78 is manufactured separately from the curved member 100 and moldboard connectors 80, and after these parts are manufactured, the circle member 78 is fixedly connected to at least one of the moldboard connectors 80 and the curved member 100. The circle member 78 can be fixed to the moldboard connectors 80 and/or the curved member 100 by, for example, a welding connection, bolts, pins, clips, etc.

Figures 7, 8:
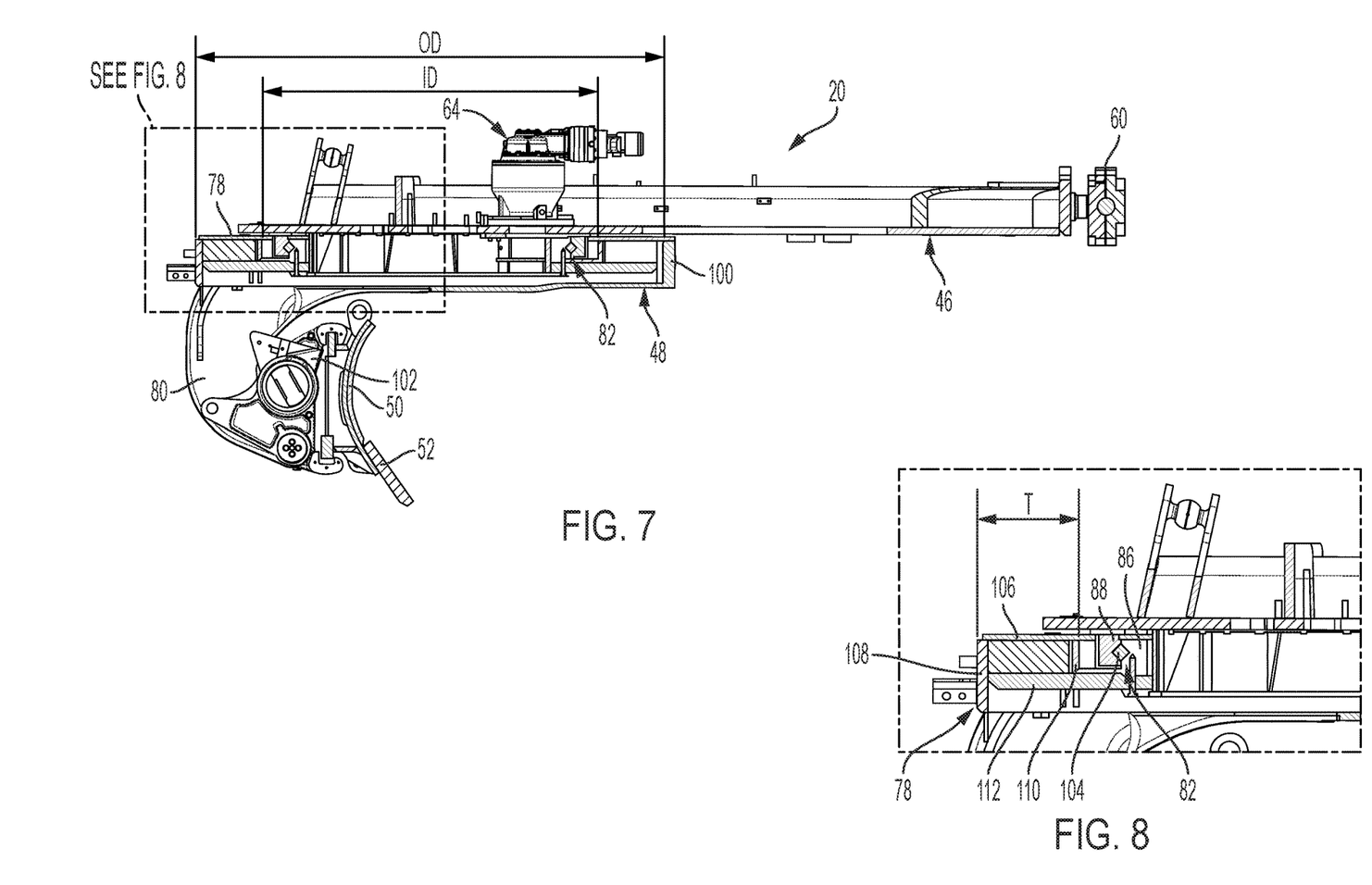
FIG. 7 is a cross-sectional view of the drawbar-circle-moldboard assembly of FIG. 2, taken along the lines 7-7 shown in FIG. 3.
FIG. 8 is a partial cross-sectional view of the drawbar-circle-moldboard assembly shown in FIG. 7.

Referring to FIGS. 7 and 8, in the illustrated embodiment, the circle member 78 is a hollow box section. The box section includes a top plate 106, an outer side plate 108, an inner side plate 110, and a bottom plate 112. In certain embodiments, the plates 106, 108, 110, 112 are welded together to form the circle member 78. The plates 106, 108, 110, 112 can be made of, for example, steel, iron, aluminum, composite, or any other suitable metallic or non-metallic material. While the illustrated embodiment shows the circle member 78 including four plates 106, 108, 110, 112 that are welded together to form a rectangular box section, it should be understood that the circle member can be formed of a hollow structure that includes any suitable number of plates and takes any suitable shape. For example, the cross-section of the circle member 78 can have a rectangular shape, a round shape, a triangular shape, or any other appropriate shape.

In certain embodiments, the upper thickness T of the circle member 78 can be greater than or equal to about 75 mm. In some embodiments, the circle member 78 has an inner diameter ID that is less than or equal to about 4,000 mm, such as less than or equal to about 3,000 mm, such as less than or equal to about 2,500 mm, such as less than or equal to about 2,100 mm, such as less than or equal to about 2,000 mm, such as less than or equal to about 1,750 mm, such as less than or equal to about 1,500 mm, such as less than or equal to about 1,000 mm. The outer diameter OD of the circle member can be, for example, between about 2,100 mm and about 5,000 mm. As the circle member 78 is made of various plates that are connected to form a hollow box section, the circle member can easily be manufactured to correspond to the desired dimensions of the curved member 100 (that receives the circle member 78) and the desired dimensions of the ring bearing 82 (that is received by the circle member 78). The circle member 78 is configured to at least partially surround the ring bearing 82 and provide a structural support to the ring bearing.

Figure 3:
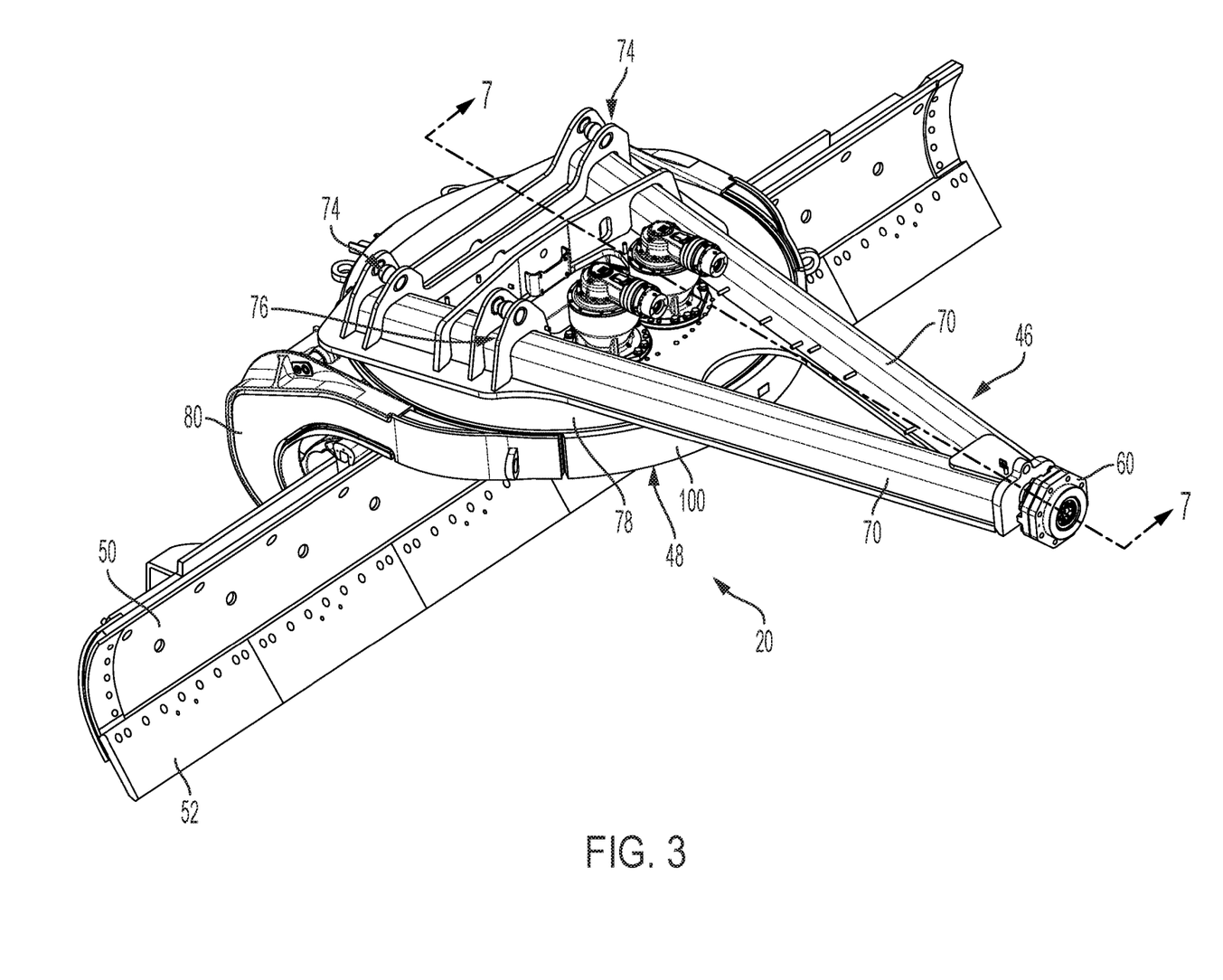
FIG. 3 is a perspective view of the drawbar-circle-moldboard assembly of FIG. 2.
Figure 4:
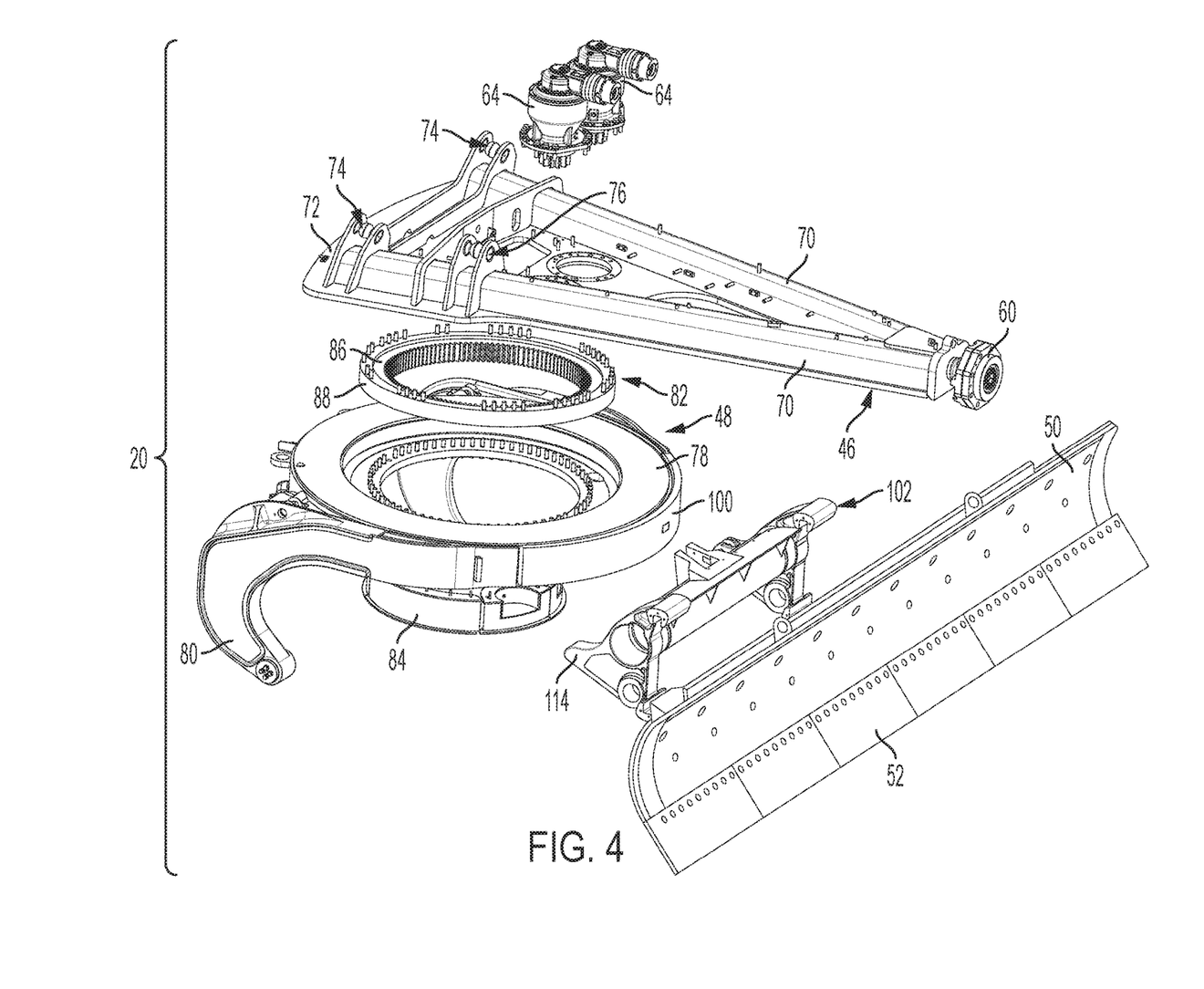
FIG. 4 is an exploded perspective view of the drawbar-circle-moldboard assembly of FIG. 2.

Referring to FIGS. 3-5, the moldboard 50 can be connected to moldboard connectors 80 of the circle assembly 48 by a moldboard bracket 102. The moldboard bracket 102 includes rear connectors 114 (only one is shown) for connecting to the moldboard connectors 80 of the circle assembly 48. In the illustrated embodiment, the moldboard connections 80 have a bore in which rear connectors 114 of the bracket 102 can be pinned to. In other embodiments, the bracket 102 can be fastened to the moldboard connectors 80 with bolts, welds, clips, shafts, cylinders, etc. The moldboard bracket 102 also includes front connectors 116 for connecting to connection members 118 of the moldboard 50. In the illustrated embodiment, front connectors 116 are pockets, and connectors 118 of the moldboard 50 are rails. Alternative connections between the bracket 102 and the moldboard 50 can be bolts, pins, shafts, welds, wearstrips, cylinders, etc. While the illustrated embodiment shows a bracket 102 for connecting the moldboard 50 to the circle assembly 48, it should be understood that the moldboard can include features for directly connecting to the circle assembly 48. In certain embodiments, the moldboard 50 includes a blade 52.

In certain embodiments, the DCM 20 includes one or more mounting structures 96 (FIG. 6) for supporting the one or more drive members 64. The mounting structures 96 can be connected to the drawbar 46 by one or more fasteners 98 (e.g., bolts pins, clips, welds, etc.) In some embodiments, the circle assembly 48 includes a cover 84 for protecting bearing teeth 94 from damage due to dirt or debris, as well as for retaining a film of grease (not shown) over the teeth 94.

Figure 9:
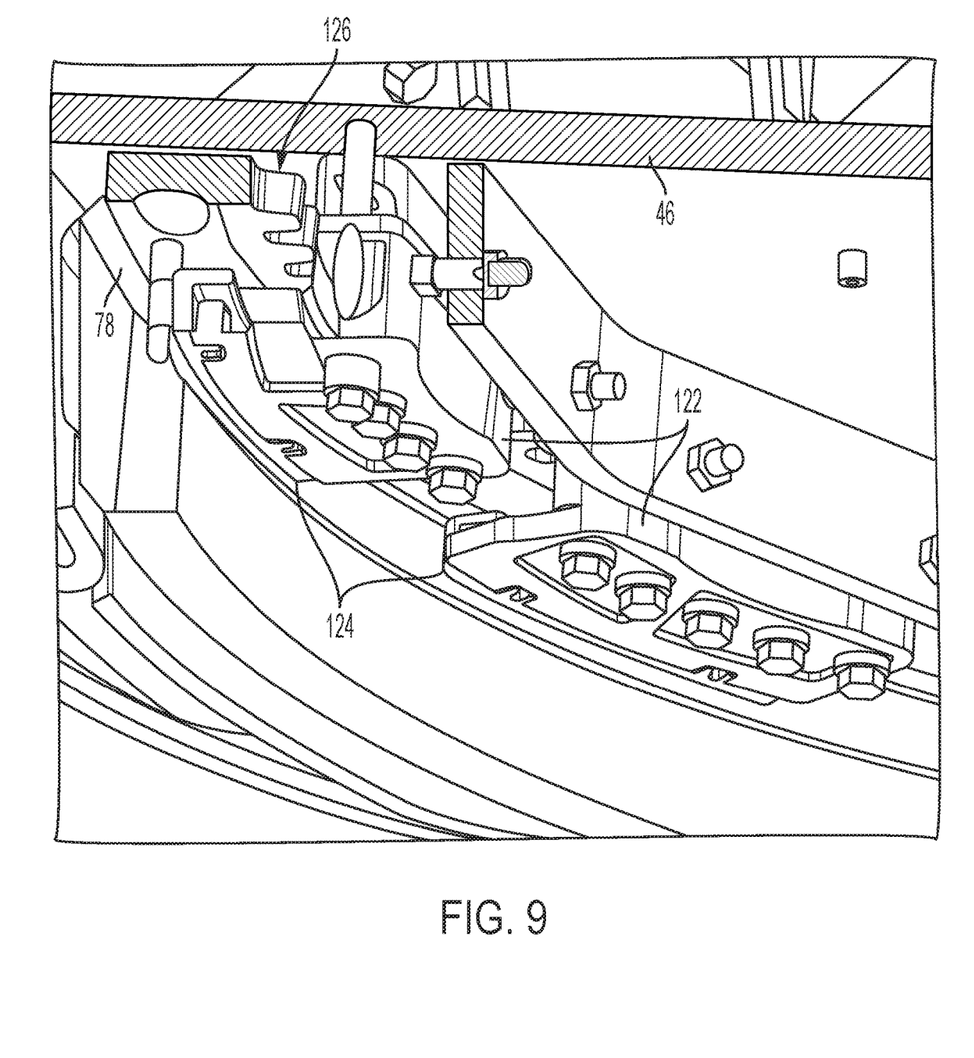
FIG. 9 is a partial perspective view of another drawbar-circle-moldboard assembly for a work machine.

Referring to FIG. 9, an alternative embodiment of a DCM 20 includes a drawbar 46, a circle assembly 48, a moldboard (not shown), and one or more drive members (not shown). The drawbar 46, moldboard, and drive members can take any suitable form, such as, for example, any form disclosed in the present application. The circle assembly 48 includes a circle member 78, one or more moldboard connectors (not shown), one or more wear strip mounts 122, and one or more wear strips 124. The circle member 78 is formed of a hollow box section, as described above with reference to FIGS. 7 and 8. In addition, the circle member 78 includes a plurality of teeth 126 that are configured to be engaged by the one or more drive members such that the circle member 78 can rotate relative to the drawbar 46. The wear strip mounts 122 are fixed to the circle member 78 and configured to receive the wear strips 124 and position the wear strips 124 to prevent wear between the circle member 78 and the drive members. The wear strips 124 can be removably attached to the wear strip mounts 122 by any suitable means, such as, for example, bolts, pins, clips, dowels, soldering, gluing, or being positively retained with the geometry of the part. In certain embodiments, the wear strips 122 can be brass pads.

INDUSTRIAL APPLICABILITY

The disclosed work machines 10 include a DCM 20 having a circle assembly 48 that is cheaper and easier to produce as compared to current circle assemblies. In addition, the DCM 20 described in the present application provides for a smaller interface between engaging components as compared to current DCMs, which provides for less maintenance on the work machine.

The circle assembly 48 includes a circle member 78 that is formed from a hollow box section. A hollow box section can be formed by, for example, welding plates together, bolting plates together, pinning plates together, snapping plates together, soldering plates together, casting plates together, clipping plates together, etc. Comparatively, roll forging has a small supply base and is an expensive process. Accordingly, a box section is cheaper and more easily produced as compared to roll-forged circle member.

A circle member 78 formed from a box section also allows for customization of the inner and outer diameters ID, OD (FIG. 7) of the circle member 78 without an excessive cost. That is, manufacturing a roll-forged ring is expensive and has a small supply base, which means the costs associated with customizing the dimensions of a roll-formed circle member would be difficult and expensive. Comparatively, a hollow box section can be customized without significantly affecting the cost of its manufacture. This is advantageous because it allows for a circle member 78 having a larger thickness T (FIG. 8), which reduces the interface between engaging components of the DCM 20. That is, with regards to the embodiment shown in FIGS. 2-8, the larger thickness T of the circle member 78 allows for use a ring bearing 82 having smaller diameter D (FIG. 5), which reduces the size, weight, and costs of the ring bearing. With regards to the embodiment shown in FIG. 9, the larger thickness T of the circle member 78 requires the use of less wear strips 124 and a smaller movement path for the wear strips (as compared to embodiments that include a larger interface between the engaging components), which reduces the costs due to the amount of wear strips and reduces the amount of time between replacement of the wear strips.

In addition, because the connection between a moldboard 50 and the moldboard connections 80 of the circle assembly 48 are common for various work machines, the outer diameter OD (FIG. 7) circle member 78 of the circle assembly 48 often needs to be sized to correspond to the moldboard connection 80 (e.g., sized to correspond to the curved member 100 shown in FIG. 5). Accordingly, in order to reduce the interface between engaging components of the DCM 20 (by reducing the inner diameter ID of the circle member 78), the thickness T of the circle member 78 needs to be increased. As discussed above, increasing the thickness of a roll-forged ring or a fabricated ring plate is difficult and expensive.

A circle member 78 formed from a hollow box section also has a higher stiffness than the current roll formed rings and fabricated ring plates, which is advantageous for preventing the circle member 78 from bending during use of the work machine 10. That is, a hollow box section has a higher section modulus than a roll formed ring and a fabricate ring plate, which means the circle member 78 formed of a hollow box section will be able to handle more force without bending than a roll formed or fabricate ring plate circle member.

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

| ELEMENT LIST | |
|---|---|
| Number | Name |
| 10 | machine |
| 12 | steerable traction device |
| 14 | driven traction device |
| 16 | power source |
| 18 | frame |
| 20 | dcm |
| 22 | operator station |
| 24 | blade control system |
| 26 | articulation joint |
| 28 | beam member |
| 30 | center shift mounting member |
| 32 | hydraulic rams |
| 34 | center shift cylinder |
| 36 | link bar |
| 38 | bell cranks |
| 40 | horizontal axis |
| 42 | vertical axis |
| 44 | horizontal axis |
| 46 | drawbar |
| 48 | circle assembly |
| 50 | moldboard assembly |
| 52 | blade |
| 54 | blade positioning cylinders |
| 56 | dashboard |
| 58 | instrument panel |
| 60 | ball |
| 62 | socket joint |
| 64 | drive members |
| 66 | hydraulic motor |
| 68 | gears |
| 70 | drawbar beams |
| 72 | circle mounting surface |
| 74 | connection elements |
| 76 | connection element |
| 78 | circle member |
| 80 | moldboard connectors |
| 82 | ring bearing |
| 84 | cover |
| 86 | inner ring |
| 88 | outer ring |
| 90 | fasteners |
| 92 | fasteners |
| 94 | teeth |
| 96 | mounting structures |
| 98 | fasteners |
| 100 | curved member |
| 102 | moldboard bracket |
| 104 | rolling members |
| 106 | top plate |
| 108 | outer side plate |
| 110 | inner side plate |
| 112 | bottom plate |
| 114 | rear connectors |
| 116 | front connectors |
| 118 | connection members |
| 120 | fasteners |
| 122 | strips |
| 124 | strips |
| 126 | teeth |

The invention claimed is:

1. A work machine, comprising:
a frame;
at least one steerable traction device connected to the frame;
at least one driven traction device connected to the frame; and
a drawbar-circle-moldboard ("DCM") assembly connected to the frame, the DCM assembly comprising:
a drawbar pivotably connected to the frame;
a circle assembly rotatably connected to the drawbar, wherein the circle assembly comprises a circle member that includes a top plate, a bottom plate, an inner side plate, and an outer side plate that together define a hollow box section,
wherein a portion of the bottom plate extends radially inward from the inner side plate to support a ring bearing;
a moldboard connected to the circle assembly; and
at least one drive member configured to rotate the circle assembly relative to the drawbar.

2. The work machine according to claim 1, wherein the DCM assembly further comprises a blade connected to the moldboard.

3. The work machine according to claim 1, wherein the circle assembly of the DCM assembly further comprises the ring bearing, wherein the ring bearing is connected to the drawbar and the circle member, and wherein the ring bearing is operatively connected to the at least one drive member.

4. The work machine according to claim 3, wherein the ring bearing comprises an inner ring and an outer ring, wherein the inner ring and the outer ring are rotatable relative to each other.

5. The work machine according to claim 4, wherein the outer ring is fixed to the drawbar by one or more fasteners, and wherein the inner ring is fixed to the portion of the bottom plate of the circle assembly by one or more fasteners.

6. The work machine according to claim 5, wherein the inner ring of the ring bearing comprises a plurality of teeth that are operatively connected to the at least one drive member.

7. The work machine according to claim 4, wherein the outer ring is positioned between the inner ring and the inner side plate of the circle member.

8. The work machine according to claim 3, wherein the ring bearing has an outer diameter of less than or equal to 2,000 mm.

9. The work machine according to claim 1, wherein the circle member of the circle assembly has an inner diameter of less than or equal to 2,100 mm.

10. The work machine according to claim 1, wherein the top plate, the bottom plate, the inner side plate, and the outer side plate of the circle member are welded together.

11. The work machine according to claim 1, wherein the circle assembly of the DCM assembly further comprises one or more wear strip mounts and one or more wear strips, wherein the one or more wear strip mounts are connected to the circle member, and wherein the one or more wear strips are removably connected to the one or more wear strip mounts.

12. The work machine according to claim 11, wherein the one or more wear strips comprise brass pads.

13. A drawbar-circle-moldboard ("DCM") assembly for a work machine, the DCM assembly comprising:
a drawbar configured to be pivotably connected to a frame of the work machine;
a circle assembly rotatably connected to the drawbar, wherein the circle assembly comprises a circle member that includes a top plate, a bottom plate, an inner side plate, and an outer side plate that together define a hollow box section,
wherein a portion of the bottom plate extends radially inward from the inner side plate to support a ring bearing; and
a moldboard connected to the circle assembly.

14. The DCM assembly according to claim 13, further comprising at least one drive member configured to rotate the circle assembly relative to the drawbar.

15. The DCM assembly according to claim 13, wherein the circle assembly of the DCM assembly further comprises the ring bearing, wherein the ring bearing is connected to the drawbar and the circle member.

16. The DCM assembly according to claim 15, wherein the ring bearing comprises an inner ring and an outer ring, wherein the inner ring and the outer ring are rotatable relative to each other, and wherein the outer ring is fixed to the drawbar and the inner ring is fixed to the portion of the bottom plate of the circle member.

17. The DCM assembly according to claim 15, wherein the ring bearing has an outer diameter of less than or equal to 2,000 mm.

18. The DCM assembly according to claim 13, wherein the circle member of the circle assembly has an inner diameter of less than or equal to 2,100 mm.

19. The DCM assembly according to claim 13, wherein the circle assembly of the DCM assembly further comprises one or more wear strip mounts and one or more wear strips, wherein the one or more wear strip mounts are connected to the circle member, and wherein the one or more wear strips are removably connected to the one or more wear strip mounts.

20. A work machine, comprising:
a frame;
at least one steerable traction device connected to the frame;
at least one driven traction device connected to the frame; and
a drawbar-circle-moldboard ("DCM") assembly connected to the frame, the DCM assembly comprising
a drawbar pivotably connected to the frame;
a circle assembly rotatably connected to the drawbar, wherein the circle assembly comprises:
a circle member comprising a top plate, a bottom plate, an inner side plate, and an outer side plate that together define a hollow box section,
wherein a portion of the bottom plate extends radially inward from the inner side plate, and
a ring bearing having an inner ring and an outer ring, wherein the inner ring is connected to the portion of the bottom plate of the circle member, wherein the outer ring is connected to the drawbar, and wherein an outer diameter of the ring bearing is less than or equal to 2,000;
a moldboard connected to the circle assembly; and
at least one drive member operatively connected to the ring bearing, wherein the at least one drive member is configured to engage the ring bearing to rotate the circle member relative to the drawbar.

* * * * *